United States Patent Office 3,179,020
Patented Apr. 20, 1965

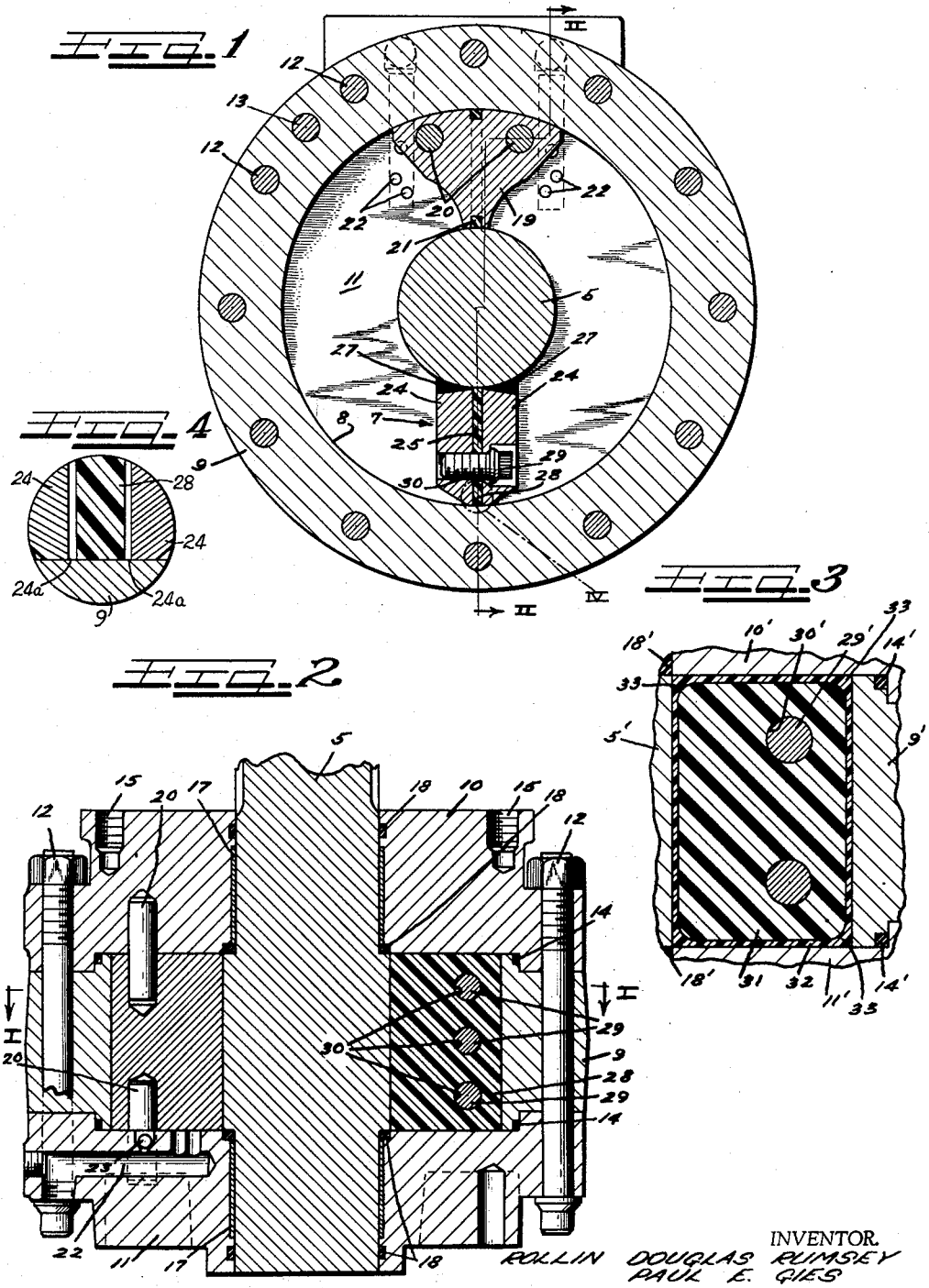

3,179,020
HYDRAULIC ROTARY ACTUATOR VANE SEAL
Rollin Douglas Rumsey, Buffalo, and Paul E. Gies, Amherst, N.Y., assignors to Houdaille Industries, Inc., Buffalo, N.Y., a corporation of Michigan
Filed Dec. 7, 1962, Ser. No. 243,041
7 Claims. (Cl. 92—125)

The present invention relates to improvements in hydraulic rotary actuators and more particularly concerns a new and useful vane seal construction.

In rotary hydraulic vane-type actuators, utilizing substantial operating pressures, leakage past the wing shaft vane structure has been a major problem. Various sealing devices have been proposed such as sealing strips, O-rings and the like, some attaining great complexity. From both an operational and economic standpoint, simplicity coupled with high efficiency are the desirable objectives.

An important object of the present invention is to provide a new and improved rotary actuator vane seal of simple construction, low cost, and high efficiency.

Another object of the invention is to provide a rotary actuator vane seal which is especially useful in single vane rotary actuators under requirements of substantial operating pressures.

A further object of the invention is to provide in a rotary hydraulic vane-type actuator an improved seal construction which avoids close production tolerances.

Still another object of the invention is to provide a new and improved hydraulic rotary vane-type actuator vane seal utilizing connecting bolts but characterized by substantial elimination of leakage along the bolt threads.

Still another object of the invention is to provide a new and improved rotary actuator vane seal of improved life characteristics.

Yet another object of the invention is to provide a new and improved seal structure for rotary hydraulic actuator vanes possessed of superior radiation resistant properties.

Other objects, features and advantages of the present invention will be readily apparent from the following detailed description of certain exemplary forms thereof, taken in conjunction with the accompanying drawing, in which:

FIGURE 1 is a sectional elevational view through a hydraulic rotary actuator, taken substantially on the line I—I of FIGURE 2;

FIGURE 2 is a sectional detail view taken substantially on the irregular section line II—II of FIGURE 1;

FIGURE 3 is an enlarged fragmentary sectional detail view showing a modification of the vane seal, and FIGURE 4 is an enlarged fragmentary sectional view taken substantially along the line IV of FIGURE 1.

In FIGURES 1 and 2, an illustrative rotary hydraulic actuator is shown including a wing shaft 5 having thereon a radially projecting wing or vane 7 operatively housed within a working chamber 8 defined by an actuator housing including a ring shaped at least internally cylindrical body 9 and a pair of end disk members 10 and 11 respectively secured to the opposite ends of the body member 9 by means of a series of securing bolts 12, with a dowel pin 13 assisting in the desired assembly orientation of the housing components. Transverse relative displacement of the body member 9 and the end members 10 and 11 is avoided by a suitable groove and flange interconnection, as best seen in FIGURE 2, with suitable annular seals 14 avoiding leakage from within the chamber 8 of hydraulic fluid through the joints between the members. One of the end members, herein the member 10 is desirably provided with means, such as threaded bolt holes 15 to facilitate attachment of the housing to equipment with which the actuator is to be used.

Relative rotation of the wing shaft 5 and the actuator housing is enabled by journalizing of opposite end portions of the wing shaft, which project beyond the respective opposite ends of the intermediate wing head portion thereof, in bearings 17 within suitable coaxial hub bores through the end members 10 and 11. For attachment to another part of the equipment with which the actuator is to be used, at least one end portion of the wing shaft 5 projects beyond one of the end members, herein the end member 10. Leakage of hydraulic fluid from within the working chamber 8 past the journalled end portions of the wing shaft 5 is avoided by suitable shaft seals 18.

Ina service, the actuator may be so related to the equipment to be actuated that the housing is held stationary while the wing shaft 5 rotates oscillatably, or alternatively the wing shaft 5 may be held stationary while the housing rotates oscillatably about the wing shaft. Such relative rotation of the wing shaft 5 and the housing is effected by means of hydraulic fluid pressure impressed upon one side of the vane 7 and the corresponding side of an abutment 19 which is fixedly mounted in the working chamber 8 between the cylindrical wall thereof and the opposing cylindrical surface of the wing shaft vane head portion with means such as dowel pins 20 extending between the abutment and the respective end members 10 and 11 securing the abutment in place. Suitable sealing means such as an O-ring 21 prevents or at least minimizes leakage past the abutment 19 between the hydraulic working sub-chambers into which the working chamber 8 is divided by the vane 7 and the abutment 19.

Hydraulic pressure fluid for motivating the actuator is supplied from a hydraulic control system associated with the equipment with which the actuator may be assembled for use. For this purpose, the actuator has respective hydraulic fluid passages 22 through the actuator housing, and in this instance in the end member 11, which are adapted to have suitably connected thereto externally of the housing hydraulic fluid conduits of the hydraulic control system. A suitable check valved branch 23 of each of the fluid passages 22, partially underlying the abutment 19, serves for cushioning movement of the actuator vane 7 toward either side of the abutment 19 as the unchecked ports from the passages 22 are closed by the vane 7. Through this arrangement, during operation, hydraulic pressure fluid is introduced into the working chamber 8 through one of the passages 22 and correspondingly exhausted through the other of the passages 22, alternatively depending upon the direction of relative rotation desired. Between rotary actuations, a static condition is maintained by hydraulically locking the vane 7 and the abutment 19 against relative oscillation anywhere within the 270° arc permitted in the illustrated arrangement.

A salient general advantage in the use of a hydraulic actuator of the kind illustrated resides in its high torque and thus working force capabilities coupled with compactness of the unit. Typically, such a unit is operated in connection with heavy duty equipment, for example earth moving machinery, derricks, and the like with hydraulic working pressures in excess of 2000 p.s.i. A desirable construction of the vane 7 for working satisfactorily under such pressure requirements comprises at least two complementary opposed wing parts having flat confronting faces spaced apart a limited distance to define a radial slot 25 coextensive with the wing parts 24 and opening toward not only the cylindrical wall surface of the working chamber 8 defined by the body 9 but also the opposing flat faces of the end members 10 and 11 which define the working chamber and are disposed at right angles to the cylindrical working chamber wall surface. Although the metal wing parts 24 are shown as rigidly attached to the metal wing shaft 5 by means of welding 27, they may obviously be formed integrally with the wing shaft and the slot 25 machined or otherwise formed and having its root on the wing shaft.

A principal function of the radial vane slot 25 is to accommodate sealing means to substantially prevent leakage past the wing shaft vane 7 between the working subchambers of the working chamber 8. Due to the sliding nature of the contact between the vane 7 and the opposed housing surfaces as required for operation and the necessary tolerances, some sort of sealing means between the edges of the vane and the housing surfaces is necessary, especially for high pressure conditions.

According to the present invention, a highly effective, simple dynamic seal is afforded by a unitary elastomeric panel seal member 28 which is dimensioned to substantially fill the slot 25 and to project from the respective edges of the vane 7 to make firm sliding sealing contact with the cylindrical and flat surfaces of the housing defining the working chamber 8. To this end, as best seen in FIGURE 2, the seal member 28 is provided with rectangularly related sealing edges thrusting sealingly against the opposing surfaces of the housing and also against the wing shaft 5 at the bottom or root of the slot 25. For efficient sealing action and to accommodate slight heat expansion, the seal member panel 28, FIGURE 4, is preferably slightly thinner than the width of the slot 25 so that it is in a free fitting or floating relation between the wing parts 24, especially adjacent the edge numeral 24a thereof. Highly efficient results have been attained where the unitary elastomeric seal member 28 is constructed of a polyurethane elastomer material of approximately 80 to 90 durometer rubber characteristics. This material lends itself readily to mass production methods of manufacture of the seal elements or members 28 by casting or by stamping them at relatively low cost from sheets of the material, using simple steel rule dies. Material of the characteristics of such a polyurethane elastomer not only has excellent frictional wear resistant properties, is quite tough and of excellent tensile strength and thus strongly resists disintegration under pressure, has desirable resilience and memory factor features, but also is of highly desirable radiation resistance.

In order to distribute the pressure load between the two wing parts 24 as operating pressure acts on either of the wing parts, one or more tie bolts or screws 29 may be provided, extending through and engaging one of the wing parts 24 with the heads of the screws and threadedly securing their shank end portions in the other of the wing parts, substantially as shown. In a small vane one such screw might be sufficient whereas in a larger vane, as shown in FIGURE 2, a plurality of such screws are employed properly spaced longitudinally of the vane for adequate load distribution.

Leakage past the threads of the screws 29 is substantially precluded by the effective direct thread seal grip afforded by the elastomeric body of unitary panel seal member 28. For this purpose, the seal member 28 is provided with cast or drilled screw hole openings 30 corresponding in number to and aligned with the screw holes in the wing parts 24 and dimensioned with respect to the threaded shanks of the screws 29 to receive the same therethrough in self-threading firmly thread sealing relation, as permitted by the resiliently yieldable characteristics of the seal material. This entirely eliminates any need for separate thread sealing means because the threaded interengagement of the body material of the seal member 28 with the screw threads under compression due to the expansion of the material by threading of the screws therethrough results in an exceedingly firm, uniform sealing grip of the threaded screw shanks. Since the edges of the seal member 28 are in firm gripping compressed sealing engagement with the opposing surfaces of the wing shaft and of the housing and the screw threads are thoroughly sealed against leakage thereby, exceedingly efficient sealing of the vane 7 against dynamic or static leakage is attained.

While the polyurethane elastomer material does have excellent wear resistant qualities, if unusually severe usage requirements demand additional life in the vane seal, the construction depicted in FIGURE 3 may be employed. This comprises a body plate 31 of an elastomeric material such as polyurethane having similar characteristics to the one-piece seal 28 of FIGURE 2 but modified in that the edge dimensions of the generally rectangular seal member 31 are slightly less than the perimeter of the space to be filled in the shaft vane in order to accommodate a peripheral seal ring 32 of a synthetic plastic material having a higher wear resistance. This sealing edging or ring 32 is desirably constructed from material having the characteristics of polytetrafluorethylene, available commercially under the trademark: Teflon, which, although it is not possessed of the strength of a polyurethane elastomer, is possessed of the unique characteristic of acting like a dry liquid in its ability to overcome frictional resistance. This is sometimes referred to as a self-lubricating property of the material. It will be observed that in order to strengthen the corner portions of the polytetrafluorethylene seal ring 32, the corners of the body panel member 31 are rounded as shown as 33. On the other hand, the housing and wing shaft engaging edges of the ring 32 are accurately conformed to the engaged surfaces, including the corners where the material is of somewhat greater thickness opposite the rounded corners 33 of the core plate seal member 31. Details of the actuator may be substantially the same as those described in connection with FIGURES 1 and 2 and primed reference numerals will be understood to relate to the same elements and conform to the description thereof, in view of the alternative utility of the vane seals in such an actuator.

From the foregoing it will be appreciated that the present invention affords a new and improved wing vane seal construction which, as compared to prior devices, is not only of simpler construction but involves substantial simplification in assembly. It is therefore of lower cost. There are fewer parts to replace, inventory problems are reduced, tolerances are liberalized, there are fewer leakage surfaces and joints, and there is substantial reduction, if not complete elimination, of leakage in the actuator due to the more uniform vane seal loading around the edges of the vane seal and around the tie bolt or equalization screw threads.

Although a single vane rotary hydraulic actuator has been selected for purposes of illustration, and the invention has been found to be especially useful in single vane actuators, it will be understood that the same vane seal structure will be found useful in multi-vane actuators.

It will be understood that modifications and variations may be effected without departing from the scope of the novel concepts of the present invention.

We claim as our invention:

1. In a rotary hydraulic actuator including a housing defining a working chamber therein with a fixed abutment and a wing shaft rotatably mounted in the housing and having a radial vane operative in said working chamber in cooperation with the abutment to effect relative rotary oscillations of the wing shaft and housing in response to pressure fluid loadings in the chamber, said vane having a radial slot opening through all edges of the vane, and an elastomeric solid panel seal member of substantial stiffness in said slot to substantially fill said slot and having edges extending from all of the edges of the vane into sealing engagement with opposing surfaces of the housing for substantially preventing leakage of hydraulic fluid from side-to-side of the vane, said panel seal member being slightly thinner than the width of the slot at least adjacent to its edges to afford a free seating generally floating relation between the sides defining the slot and thereby improve the sealing action of the panel seal member and accommodate any slight heat expansion thereof.

2. In a rotary hydraulic actuator including a housing defining a working chamber therein with a fixed abutment and a wing shaft rotatably mounted in the housing and having a radial vane operative in said working chamber in cooperation with the abutment to effect relative rotary oscillations of the wing shaft and housing in response to pressure fluid loadings in the chamber, said vane having a radial slot extending substantially the radial distance and the longitudinal distance of the vane and opening through all edges of the vane, a unitary elastomeric solid panel seal member in said slot and having edges extending from all of the edges of the vane into sealing engagement with opposing surfaces of the housing for substantially preventing leakage of hydraulic fluid from side-to-side of the vane, and screw means connecting the parts of the vane separated by said slot for distributing the working load between the separated parts as pressure acts on any one of the parts, said screw means being threaded through said seal panel member and in direct thread sealed engagement therewith.

3. In a rotary hydraulic actuator including a housing defining a working chamber therein with a fixed abutment and a wing shaft rotatably mounted in the housing and having a radial vane operative in said working chamber in cooperation with the abutment to effect relative rotary oscillations of the wing shaft and housing in response to pressure fluid loadings in the chamber, said vane having a radial slot extending substantially the radial distance and the longitudinal distance of the vane and opening through all edges of the vane, and a unitary sealing solid panel engaged in and substantially filling said slot and comprising elastomer material on the order of polyurethane of about 80–90 durometer characteristics, the edges of the sealing panel extending from the edges of the vane and engaging sealingly with the opposed surfaces of the housing defining the chamber.

4. In a rotary hydraulic actuator including a housing having therein a hydraulic working chamber with an abutment and a rotatably journalled wing shaft having a vane extending radially into the chamber and coacting with the abutment in effecting relative rotary oscillatory movement of the housing and the wing shaft under hydraulic fluid pressure, said vane comprising at least a pair of vane parts substantially rigidly integral with the shaft and defining therebetween a narrow radial slot coextensive with the vane and opening through all edges of the vane and having the root thereof on the wing shaft, and a unitary elastomeric high wear resistance tough vane seal panel engaged in said slot and having edges thereof thrusting sealingly against the wing shaft and projecting from the respective edges of the vane into engagement with all opposed surfaces of the housing within the chamber and effecting a substantially fluid tight seal therewith substantially preventing hydraulic pressure fluid leakage past the vane, said panel being slightly thinner than the width of the slot especially adjacent to the edges thereof to afford a free fitting generally floating relation between the vane parts and thereby improve the sealing action of the panel and accommodate slight heat expansion of the panel.

5. In a rotary hydraulic actuator including a housing having therein a hydraulic working chamber with an abutment and a rotatably journalled wing shaft having a vane extending radially into the chamber and coacting with the abutment in effecting relative rotary oscillatory movement of the housing and the wing shaft under hydraulic fluid pressure, said vane comprising at least a pair of vane parts and defining therebetween a narrow radial slot coextensive with the vane and opening through all edges of the vane and having the root thereof on the wing shaft, a unitary elastomeric high wear resistance tough vane seal solid panel engaged in and substantially filling said slot and having edges thereof thrusting sealingly against the wing shaft and projecting from the respective edges of the vane into engagement with all opposed surfaces of the housing within the chamber and effecting a substantially fluid tight seal therewith substantially preventing hydraulic pressure fluid leakage past the vane, and tie bolt screw means extending through and between said vane parts and connecting them for distribution of load under hydraulic pressure, said screw means being threaded to said seal panel in sealed relation therewith.

6. In a rotary hydraulic actuator including a housing having therein a hydraulic working chamber with an abutment and a rotatably journaled wing shaft having a vane extending radially into the chamber and coating with the abutment in effecting relative rotary oscillatory movement of the housing and the wing shaft under hydraulic fluid pressure, said vane comprising at least a pair of vane parts and defining therebetween a narrow radial slot coextensive with the vane and opening through all edges of the vane and having the root thereof on the wing shaft, a unitary elastomeric high wear resistance tough vane seal solid panel engaged in and substantially filling said slot and having edges thereof thrusting sealingly against the wing shaft and projecting from the respective edges of the vane into engagement with all opposed surfaces of the housing within the chamber and effecting a substantially fluid tight seal therewith substantially preventing hydraulic pressure fluid leakage past the vane, and tie bolt screw means extending through and between said vane parts and connecting them for distribution of load under hydraulic pressure, said screw means being threaded to said seal panel in sealed relation therewith, said seal panel comprising a polyurethane material of about 80 to 90 durometer rubber characteristics.

7. In a rotary hydraulic actuator including a housing having therein a hydraulic working chamber with an abutment and a rotatably journalled wing shaft having a vane extending radially into the chamber and coacting with the abutment in effecting relative rotary oscillatory movement of the housing and the wing shaft under hydraulic fluid pressure, said vane comprising at least a pair of substantially rigidly integral vane parts and defining therebetween a narrow radial slot opening through all edges of the vane and extending substantially the radial distance and the longitudinal distance of the vane, a unitary elastomeric high wear resistance tough vane seal solid panel engaged in said slot and having sealing edges thereon thrusting sealingly against the wing shaft and projecting from the respective edges of the vane into engagement with all opposed surfaces of the housing within the chamber and effecting a substantially fluid tight seal therewith substantially preventing hydraulic pressure fluid leakage past the vane, and tie bolt screw means extending through and between said vane parts and connecting them for distribution of load under hydraulic pressure, said screw means being threaded to said seal panel in sealed relation therewith, said seal panel comprising a polyurethane material of about 80 to 90 durometer rubber characteristics, said seal panel being slightly thinner than the width of the slot adjacent to said seal edges to afford a substantially free fitting generally floating relation thereof between the vane parts and thereby improve the sealing action of the seal edges and accommodate a slight heat expansion of the panel.

References Cited by the Examiner
UNITED STATES PATENTS

| | | | |
|---|---|---|---|
| 1,117,370 | 11/14 | Goodrich | 121—97 |
| 2,612,875 | 10/52 | O'Shei | 92—125 |
| 2,811,142 | 10/57 | Shafer | 121—99 |
| 2,893,210 | 7/59 | Muszynski | 121—97 |
| 2,897,807 | 8/59 | Landrum | 121—97 |
| 3,021,822 | 2/62 | Rumsey | 123—8 |
| 3,048,414 | 8/62 | Pearce et al. | 277—130 |
| 3,103,281 | 9/63 | Rumsey et al. | 92—125 |

FOREIGN PATENTS 623,229  5/49  Great Britain.

FRED E. ENGELTHALER, *Primary Examiner.*
KARL J. ALBRECHT, *Examiner.*